United States Patent [19]

Yoshiura

[11] Patent Number: 4,885,640
[45] Date of Patent: Dec. 5, 1989

[54] IMAGE READING APPARATUS

[75] Inventor: Shoichiro Yoshiura, Nara, Japan

[73] Assignee: Sharp Kabushiki Kaisha, Osaka, Japan

[21] Appl. No.: 117,484

[22] Filed: Nov. 5, 1987

[30] Foreign Application Priority Data

Nov. 7, 1986 [JP] Japan .................... 61-171809[U]
Nov. 7, 1986 [JP] Japan .................... 61-171812[U]

[51] Int. Cl.⁴ .................................................. H04N 1/04
[52] U.S. Cl. .................................. 358/400; 358/474
[58] Field of Search ............. 358/256, 293, 285, 290, 358/296; 355/1, 30; 350/582

[56] References Cited

U.S. PATENT DOCUMENTS

| | | | |
|---|---|---|---|
| 4,074,217 | 2/1978 | Yanagawa | 355/30 |
| 4,262,999 | 4/1981 | Sato | 355/30 |
| 4,523,235 | 6/1985 | Rajchman | 358/293 |
| 4,611,246 | 9/1986 | Nihei | 358/256 |
| 4,626,925 | 12/1986 | Toyoda | 358/285 |
| 4,652,937 | 3/1987 | Shimura | 358/293 |
| 4,684,998 | 8/1987 | Tanioka | 358/256 |
| 4,701,804 | 10/1987 | Toyoda | 358/285 |
| 4,707,747 | 11/1987 | Rockwell, III | 358/293 |
| 4,731,668 | 3/1988 | Satomura | 358/256 |
| 4,742,559 | 5/1988 | Fujiwara | 358/294 |

Primary Examiner—Edward L. Coles, Sr.
Assistant Examiner—Jerome Grant
Attorney, Agent, or Firm—Flehr, Hohbach, Test, Albritton & Herbert

[57] ABSTRACT

An image reading apparatus such as a portable copier has a contact surface with a window at the bottom of its housing for slidably contacting a document to be scanned. A cover attached rotatably or slidably to the housing which can be closed to clean and protect the window is so structured that some of its edges become coplanar with the contact surface to provide additional stability to the apparatus when the cover is opened for a scan.

3 Claims, 2 Drawing Sheets

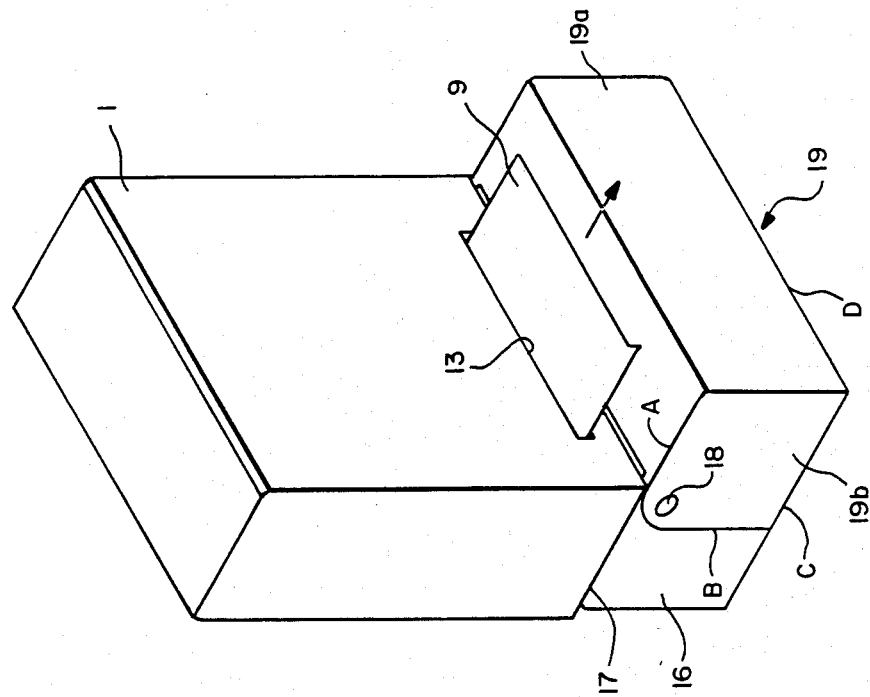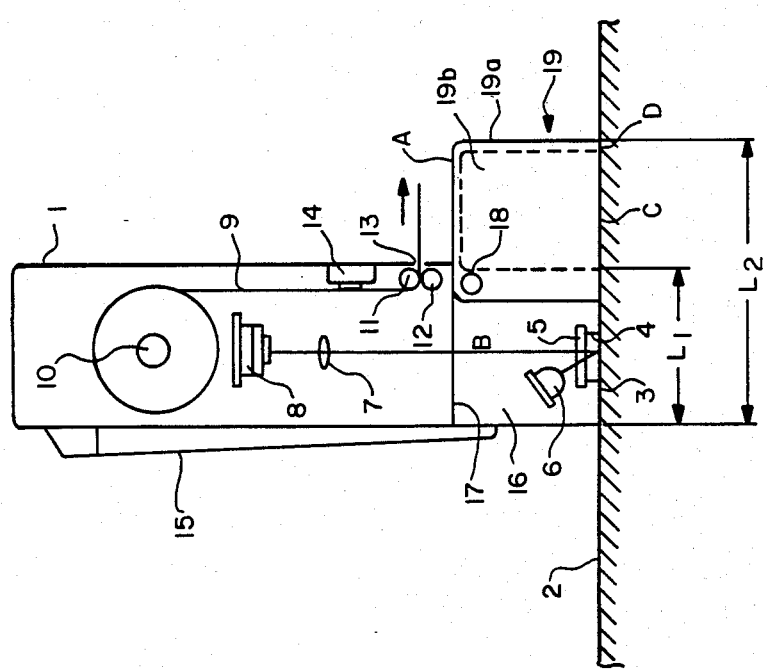

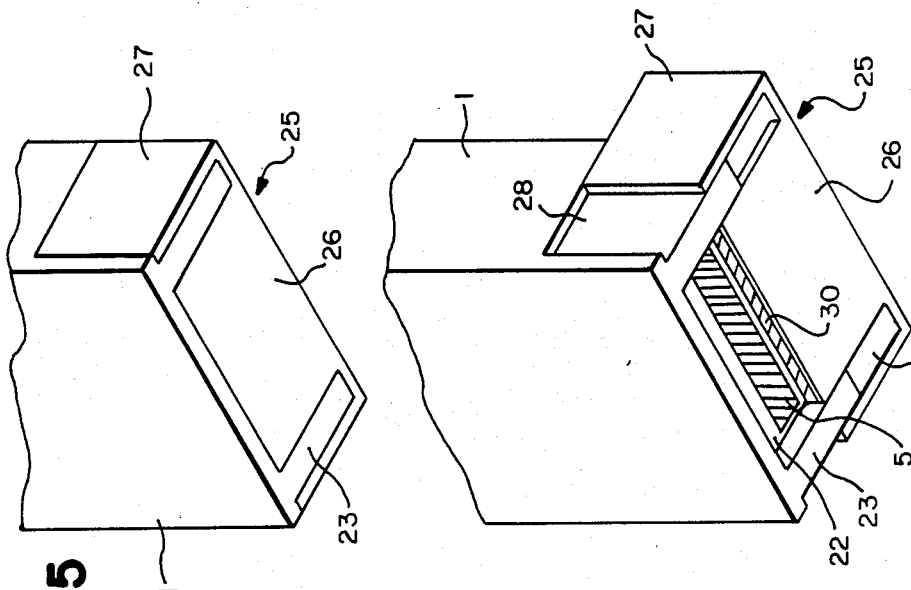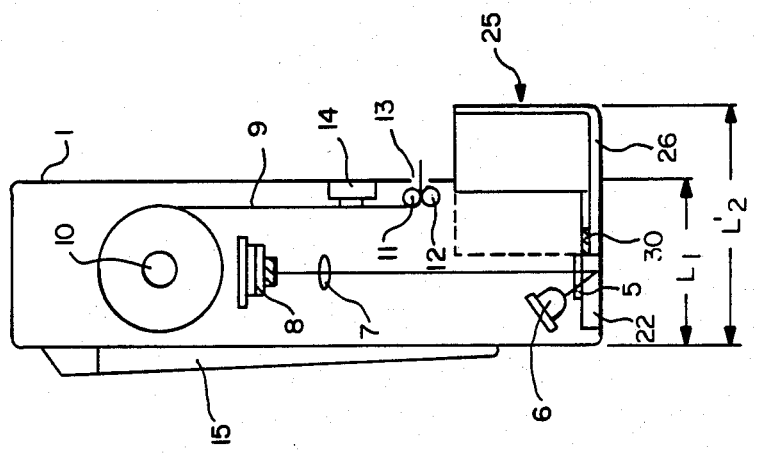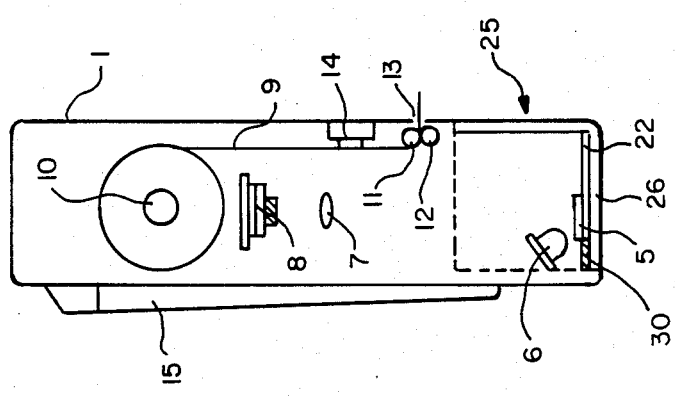

IMAGE READING APPARATUS

BACKGROUND OF THE INVENTION

This invention relates to an image reading apparatus for manually operating to scan a document to read an image therefrom.

Portable copiers serving as an image reader and recorder are currently being developed. Such portable copiers are typically formed with a window provided with a transparent member of glass or the like and the copier is manually moved over a document to be scanned with the window kept in contact with or near its surface such that image data received from the document are recorded on a sheet of thermal paper or the like. Recently, there have been many attempts to make such copiers smaller, lighter and thinner.

Since such a portable copier is intended to be operated manually for a scan, however, it tends to become unsteady when the user holds it with one hand to move it over the document to be scanned and if its window is moved away from the document surface, image data cannot be correctly received and there may appear black spots, for example, on the printed image. If the copier is made very thin, in particular, this problem can occur more frequently because the area of contact with the document becomes smaller accordingly.

Another problem associated with copiers of this type relates to dust and paper particles from the document, etc. which are easily deposited on the transparent member covering the window. Such deposited particles tend to produce unwanted shadows which are additionally received as image data to adversely affect the quality of the printed image. Previous attempts to clean such a transparent member included use of a bar with one end wrapped with cotton but such a procedure is troublesome and not very effective especially if the member is made of a soft plastic material because even a slight force thereon for cleaning may harm its surface.

SUMMARY OF THE INVENTION

It is therefore an object of the present invention in view of the aforementioned problems to provide a portable copier which can be operated steadily for a manual scan.

It is another object of the present invention to provide such a portable copier of which the transparent member covering its window can be cleaned easily and effectively.

The above and other objects of the present invention are achieved by providing a cover to a portable copier having a scanning window such that, when this cover is closed, it can cover the window and, when it is opened, a portion thereof will be flush with the copier's contact surface with the document to be scanned. Such a cover may be attached to the copier housing either rotatably or slidably. A cleaner is further attached to the cover which can be opened and closed such that the transparent member near the window can be cleaned as the cover is opened and closed to simultaneously move the cleaner over the surface of this transparent member.

BRIEF DESCRIPTION OF THE DRAWINGS

The accompanying drawings, which are incorporated in and, form a part of the specification, illustrate embodiments of the present invention and, together with the description, serve to explain the principles of the invention. In the drawings:

FIG. 1 is a schematic sectional view of a portable copier embodying the present invention to show its structure, FIG. 2 is an external diagonal view of the copier of FIG. 1, FIG. 3 is a schematic sectional view of another portable copier embodying the present invention when its cover is closed, FIG. 4 is a schematic sectional view of the copier of FIG. 3 when its cover is opened, FIG. 5 is an external diagonal view of the bottom portion of the copier of FIGS. 3 and 4 when its cover is closed, and FIG. 6 is an external diagonal view of the bottom portion of the copier of FIGS. 3, 4 and 5 when its cover is opened.

DETAILED DESCRIPTION OF THE INVENTION

With reference to FIGS. 1 and 2, a portable copier serving as an image reading and recording apparatus has a substantially rectangular box-shaped housing 1 with its bottom formed as a contact surface 3 for slidably contacting an original document 2 intended to be scanned and a window 4 formed approximately at the center of this contact surface 3. A light-transmissive member 5, for example, of glass is affixed to the housing 1 inside this window 4 parallel to the contact surface 3. Diagonally above the light-transmissive member 5 near the bottom of the housing 1, there is a light source 6 such as a light-emitting diode. A lens 7 is disposed at about one-half of the height of the housing 1 and a CCD (charge coupled device) 8 is disposed further thereabove as a reading device.

In the upper part of the housing 1, an axis 10 around which thermosensitive paper 9 is wound as a roll is rotatably supported. A paper outlet opening 13 is provided on the front wall of the housing 1 and a pair of paper transporting rollers 11 and 12 for unwinding the paper 9 from the axis 10 and transporting it downward is disposed opposite to this outlet opening 13. A recording head 14 for recording image data on the paper 9 is affixed to the front wall of the housing 1 above the rollers 11 and 12. An elongated, rectangular print switch 15 for operating the components inside the housing 1 is disposed protrudingly from the back wall of the housing 1. FIG. 1 shows the print switch 15 in its OFF position. The print switch 15 is movable between this OFF position and an ON position which is assumed when the print switch 15 is pushed into the interior of the housing 1. Although not shown in the figures for simplicity, the housing 1 also contains an appropriate distance detector for detecting the distance traveled by the CCD 8 on the document 2 when it is being used for scanning. A narrowed rectangular section 16 is formed at the bottom of the housing 1 with a step 17 at the top of this narrowed section 16. An axis 18 penetrates the upper frontal part of the narrowed section 16 and a cover 19 is rotatably attached to the housing 1 around this axis 18. The cover 19 is comprised of a covering section 19a which extends transversely with respect to the housing 1 and has an L-shaped cross-section and rectangular side plates 19b unistructurally formed with and at both ends of this covering section 19a. When the cover 19 is opened, as shown in both FIGS. 1 and 2, a portion of the edge A of the side plates comes into contact with the step 17 and the cover 19 assumes a position with respect to the housing 1 such that the edges C of the side plates 19b and the edge D of the covering section 19a are coplanar with the aforementioned contact surface 3.

For a copying operation, the copier thus structured is held by one hand with the covers 19 in the opened condition and while the print switch 15 is pressed, it is manually moved slidingly over the document 2 with the contact surface 3, the edges C of the side plates 19b and the edge D of the covering section 19a in contact with the document 2. The document 2 is exposed to the light from the source 6 through the transparent member 5 and the reflected light from the document 2 is received by the CCD 8 through the transparent member 5 and the lens 7. The image data from the document 2 thus read by the CCD 8 are converted into an electrical signal. During this operation, instability of the copier as it is moved over the document 2 can be reduced and the stability of its scan improved because not only the contact surface 3 of the housing 1 with length $L_1$ in the direction of the scan but also the edges C and D of the cover 19 are in contact with the document 2 such that the total length $L_2$ of the area in contact with the document 2 in the direction of the scan is substantially greater than $L_1$. This naturally has the favorable consequence of improving the accuracy with which the image data can be read by the CCD 8.

Moreover, the distance by which the CCD 8 moves over the document 2 is detected by the aforementioned distance detector. This distance detector is adapted to output a timing signal to the recording head 14 whenever the CCD 8 is found to have traveled a predetermined distance and the recording head 14 is adapted to record on the paper 9 an image corresponding to the image data from the document 2 based on the aforementioned electrical signal from the CCD 8 whenever such a timing signal is received. After recording is completed, the paper 9 is discharged by the rollers 11 and 12 through the outlet opening 13.

Upon completion of a copying operation, the cover 19 is closed by rotating it by 90° in the clockwise direction (with respect to FIG. 1) around the axis 18. The contact surface 3 is thereby covered by the covering section 19a and the transparent member 5 is protected against dust and damage by contact. When the cover 19 is closed, the side plates 19b are in contact with the step 17 and the narrowed section 16 is covered by these side plates 19b.

Another portable copier embodying the present invention serving as an image reading and recording apparatus is described next by way of FIGS. 3, 4, 5 and 6 where components which are identical or similar to those already explained in connection with FIGS. 1 and 2 are designated by the same numerals. The housing 1 of this copier is characterized as having a rectangular concave section 22 on its bottom surface and a contact surface 23 formed around this concave section 22 for making a slidable contact with a document (not shown) to be scanned. The transparent member 24 of glass or the like is affixed to the housing 1 opposite to the concave section 22. Numeral 25 indicates a cover having front, side and bottom walls and disposed at the bottom of the housing 1 such that it can be moved between a closed position shown in FIGS. 3 and 5 where the cover 25 covers the transparent member 5 and the open position shown in FIGS. 4 and 6 where the cover 25 exposes the transparent member 5. The bottom wall 26 of the cover 25 is movably engaged with the concave section 22. The side walls 27 of the cover 25 are movably engaged with concave sections 28 provided on both sides of the bottom of the housing 1. The lower surface of the bottom wall 26 is coplanar (or flush) with the contact surface 23 whether the cover 25 is in the closed position (FIGS. 3 and 5) or in the open condition (FIGS. 4 and 6). Numeral 30 indicates a cleaner attached to an upper backward position of the bottom wall 26 so as to be reachable to the transparent member 5 and to move therealong as the cover 25 is moved between its closed and open positions.

When the copier described above by way of FIGS. 3, 4, 5 and 6 is used for a scan, the cover 25 is opened first as shown in FIGS. 4 and 6. As the cover 25 is opened, the cleaner 30 moves along and cleans the transparent member 5. Thereafter, the user holds the copier with one hand, causes the contact surface 23 and the lower surface of the bottom wall 26 to touch the document to be scanned and moves the copier manually over the document while pressing the print switch 20. Thereupon, the document is exposed to the light from the source 6 sequentially from one edge thereof through the transparent member 5 and the reflected light from the document is received by the CCD 8 through the transparent member 5 as explained above in connection with FIGS. 1 and 2.

It should be noted that the cover 25 is opened when the copier is being used for a scan such that the distance $L'_2$ of the total area in contact with the document during such a scan in the direction perpendicular to that of the scan is significantly greater than the distance $L_1$ defined above with reference to FIG. 1. Thus, instability of the copier as it is moved over the document to scan it can be reduced and the stability of its scanning operation can be improved. Another advantage of the copier of FIGS. 3, 4, 5 and 6 is that the transparent member 5 is cleaned by the cleaner 30 before the start of each scan so as to allow the copier to read an image more accurately. When the cover 25 is closed after a copying operation is completed, the cleaner 30 moves along and cleans the transparent member 5 again. Once the cover 25 is closed, the transparent member 5 is protected against dust and damage by contact.

The foregoing description of preferred embodiments of the invention has been presented for purposes of illustration and description. It is not intended to be exhaustive or to limit the invention to the precise form disclosed, and many modifications and variations are possible in light of e above teaching. For example, although the present invention was described above by way of a portable copier serving as an image reading and recording apparatus, the present invention is applicable equally well to image readers of other types. Such modifications and variations that may be apparent to a person skilled in the art are intended to be included within the scope of this invention.

What is claimed is:

1. In an image reading apparatus comprising a housing having a contact surface for slidably contacting a document, a scanning window formed on said contact surface and reading means for reading an image on said document through said window, said apparatus being adapted to be manually moved with respect to said document for reading said image, the improvement wherein said apparatus further comprises a transparent member disposed near said window such that said reading means read said image therethrough, a cleaner for cleaning said transparent member, and a cover which is attached to said housing movably between a first position where said cover covers said window and a second position where said cover uncovers said window, a portion of said cover being coplanar with said contact surface when said cover is in said second position so as to provide a substantially greater area of support to said apparatus than said contact surface on a document being scanned.

2. The apparatus of claim 1 wherein said cleaner is adapted to move along said transparent member as said cover is moved between said first and second positions.

3. The apparatus of claim 1 wherein said cleaner is affixed to said cover.

* * * * *